(12) United States Patent
Davies

(10) Patent No.: US 9,523,774 B2
(45) Date of Patent: Dec. 20, 2016

(54) DETECTION OF SPOOFED SATELLITE SIGNALS

(71) Applicant: Raytheon Company, Waltham, MA (US)

(72) Inventor: Stephen P. Davies, Waltham, MA (US)

(73) Assignee: Raytheon Company, Waltham, MA (US)

( * ) Notice: Subject to any disclaimer, the term of this patent is extended or adjusted under 35 U.S.C. 154(b) by 529 days.

(21) Appl. No.: 14/066,897

(22) Filed: Oct. 30, 2013

(65) Prior Publication Data

US 2015/0226857 A1   Aug. 13, 2015

(51) Int. Cl.
*G01S 19/21*   (2010.01)

(52) U.S. Cl.
CPC .................. *G01S 19/215* (2013.01)

(58) Field of Classification Search
USPC .............. 342/357.4, 357.46, 357.47, 357.59; 455/3.02, 410; 701/468, 519
See application file for complete search history.

(56) References Cited

U.S. PATENT DOCUMENTS

| | | |
|---|---|---|
| 5,557,284 A | 9/1996 | Hartman |
| 7,697,919 B1 | 4/2010 | Stratton et al. |

*Primary Examiner* — Dao Phan

(57) ABSTRACT

A technology is provided for detecting spoofed satellite signals. An aircraft may be equipped with a top antenna that is adapted to receive satellite signals and a bottom antenna that is adapted to receive terrestrial signals. A signal may be received on the top antenna and the bottom antenna. Relative signal strength between the top antenna and the bottom antenna may be used to differentiate satellite sourced signals from terrestrial sourced signals.

9 Claims, 7 Drawing Sheets

DETECTION OF SPOOFED SATELLITE SIGNALS

BACKGROUND

The number of global and regional satellite communication and navigation systems has grown rapidly in recent years among military, civil and commercial users around the world. In general, satellite-based communication and navigation systems provide location and time information. Typically, satellite communication and navigation systems may function anywhere on or near the Earth where there is an unobstructed line of sight to one or more satellite. Thus, satellite signals may not be received inside buildings, at subterranean locations, or underwater. Satellite communication and navigation systems have a variety of applications on land, at sea, and in the air. For example, satellite communication and navigation systems may facilitate activities such as banking, mobile phone operations, navigation of commercial aircraft and boats, scientific studies, tracking, and surveillance.

There is growing reliance of aircraft on satellite communication, navigation and information (e.g., weather) systems. Satellite signals may be spoofed to disrupt aircraft operations and/or to crash the aircraft. For example, a spoofed satellite navigation signal may attempt to cause an aircraft to fly off course. An ability to authenticate satellite signals protects against spoofing. Some techniques to authenticate satellite signals may rely on unique characteristics of the signals, and therefore cannot be applied to all satellite signals. For example, techniques used to authenticate a navigation signal may not work for a communication signal.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
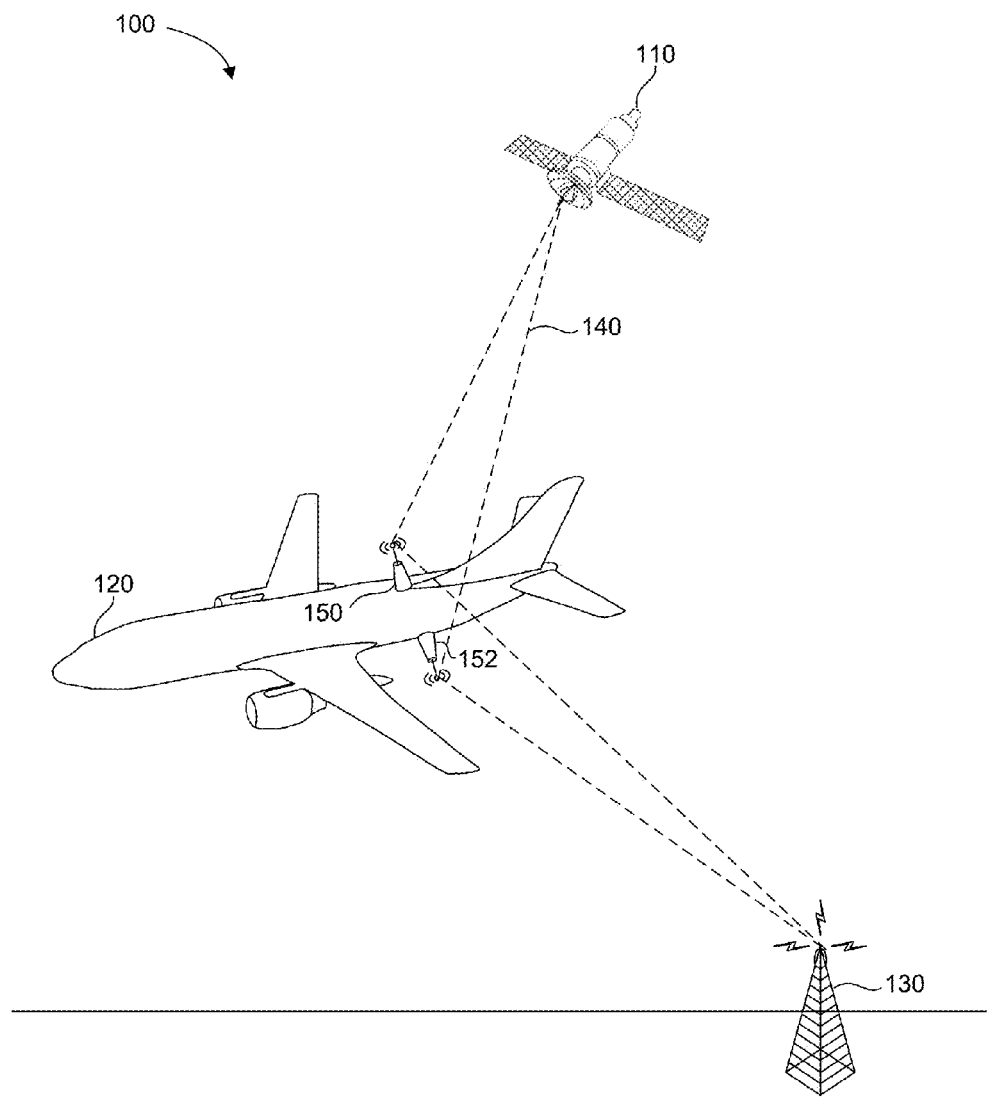
FIG. 1 is an example illustration of an aircraft receiving satellite signals from a satellite source and a terrestrial source in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

There is a growing reliance of aircraft on satellite communication, navigation and information (e.g., weather) systems. Satellite communication and navigation systems include, but are not limited to, global positioning system (GPS), Global Navigation Satellite System (GLONASS), Galileo, Indian Regional Navigational Satellite System (IRNSS), Compass, Beidou, Doppler Orbitography and Radio-positioning Integrated by Satellite (DORIS), and Quasi-Zenith Satellite System (QZSS). Spoofing of satellite navigation and communication signals may pose a threat to aviation safety. Other techniques to authenticate satellite signals may rely on unique characteristics of navigation signals, and therefore cannot be applied to all satellite signals. For a number of reasons (e.g. ease of deployment, ease of concealment), spoofed satellite signals are most likely broadcast from terrestrial transmitters.

Satellite communication or navigation signals may be spoofed to disrupt aircraft operations and/or to crash the aircraft. In general, a satellite system spoofing attack, such as a global positioning system (GPS) spoofing attack, may attempt to deceive a satellite receiver by broadcasting a spoofed signal with greater signal strength than compared to the satellite signal. The spoofed signal may cause the satellite receiver to determine an incorrect location. In other words, the spoofed signal may communicate a false location to the satellite receiver. As an example, the spoofed signal may falsely communicate a position that is a few degrees off of the satellite receiver's actual position. As a result, the satellite receiver may falsely determine that the aircraft is off course, even though the aircraft is traveling in the correct orientation. The aircraft may adjust its orientation to correspond with the spoofed signal, thereby causing the aircraft to travel off course. Satellite spoofing may trick a navigation system by communicating spoofed signals, whereas satellite jammers may prevent satellite receivers from receiving satellite signals altogether.

The threat of spoofed satellite signals may be mitigated by using encrypted satellite signals. Since the parties that attempt to disrupt the satellite communication may not have knowledge of the proper encryption keys, the spoofed signals may be distinguished from the authentic satellite signals. However, cryptographic techniques may be difficult to implement in civil aviation services because of the challenges related to distributing and authenticating keys. Furthermore, existing services may not support cryptographic techniques for authenticating satellite signals.

In general, aircraft operations may be threatened by spoofed signals from a terrestrial transmitter. In other word, the party attempting to disrupt the aircraft operations may be based on the ground, rather than the sky. Although it is possible that spoofed signals may be communicated from a satellite source, the likelihood of the spoofed signals being communicated from the satellite source may be low when compared to the likelihood of the spoofed signals being communicated from the terrestrial transmitter.

An antenna that is shadowed by a structure of an aircraft, such as body, wings, or tail, may receive a more attenuated signal than an antenna that is not shadowed. When an aircraft has one or more antennas on both the upper surface and lower surface of the aircraft, the strength of the signal received via the upper and lower antennas may be compared to determine if the source of the signal is above or below the aircraft. Signals from satellites may generally be received stronger via antennas on the upper surface of an aircraft. Signals from terrestrial sources may generally be received stronger via antennas on the lower surface of an aircraft. This can be used to authenticate legitimate satellite signals and reject spoofed satellite signals from a terrestrial source.

In one example, the source of the signals may be determined by installing two satellite antennas and two satellite signal receivers on the aircraft. In one configuration, more than two satellite antennas and two satellite signal receivers may be installed on the aircraft.

In one exemplary embodiment, a first antenna used to receive signals may be installed in proximity to the top of the aircraft. A second antenna may be installed in proximity to the bottom of the aircraft. In an alternative configuration, the first antenna and the second antenna may be installed in proximity to various locations on the surface of the aircraft, such as the top of the aircraft, the bottom of the aircraft, the wings of the aircraft, etc. In an alternative configuration, the first antenna and the second antenna may be installed on the tail of the aircraft or the nose of the aircraft. In yet another alternative configuration, the first antenna and the second antenna may be installed in proximity to various locations on the surface of the vehicle.

The first antenna and the second antenna may receive signals whether the signal originates from a satellite or from a terrestrial source. However, due to the directional characteristics of the antennas and masking by the aircraft body, the observed signal strengths between the antennas may vary depending on whether the antenna is pointing towards the source of the signal or away from the source of the signal. The signals may have a respective signal strength. In one example, the signal strength may be directly determined by a satellite receiver. In an alternative configuration, the signal strength may be determined using a signal to noise ratio (SNR). The SNR may be defined as the ratio of signal power to the noise power, and is expressed in decibels (dB).

The signal strengths associated with the first and second antennas, respectively, may be compared. In general, if the signal strength from the top antenna is greater than the signal strength from the bottom antenna, then the source signal may likely be a satellite source, and indicate a non-spoofed signal. In general, if the signal strength from the top antenna is less than the signal strength from the bottom antenna, then the source signal may likely be a terrestrial source (i.e., indicating that the signals may be spoofed).

FIG. 1 is an example illustration 100 of an aircraft 120 receiving satellite signals 140 from a satellite source 110 or a terrestrial source 130. The terrestrial source 130 may be a terrestrial spoofing device that broadcasts spoofed signals, from ground level, to the aircraft 120. The aircraft 120 may include a top antenna 150 and a bottom antenna 152. The top antenna 150 may be located in an upper region of the aircraft 120 and the bottom antenna 152 may be located in a lower region of the aircraft 120. In alternative configurations, the aircraft 120 may include more than two antennas located in proximity to various regions of the aircraft (e.g., the bottom of the aircraft 120, the top of the aircraft 120, the front of the aircraft 120, the back of the aircraft 120).

Figure 2:
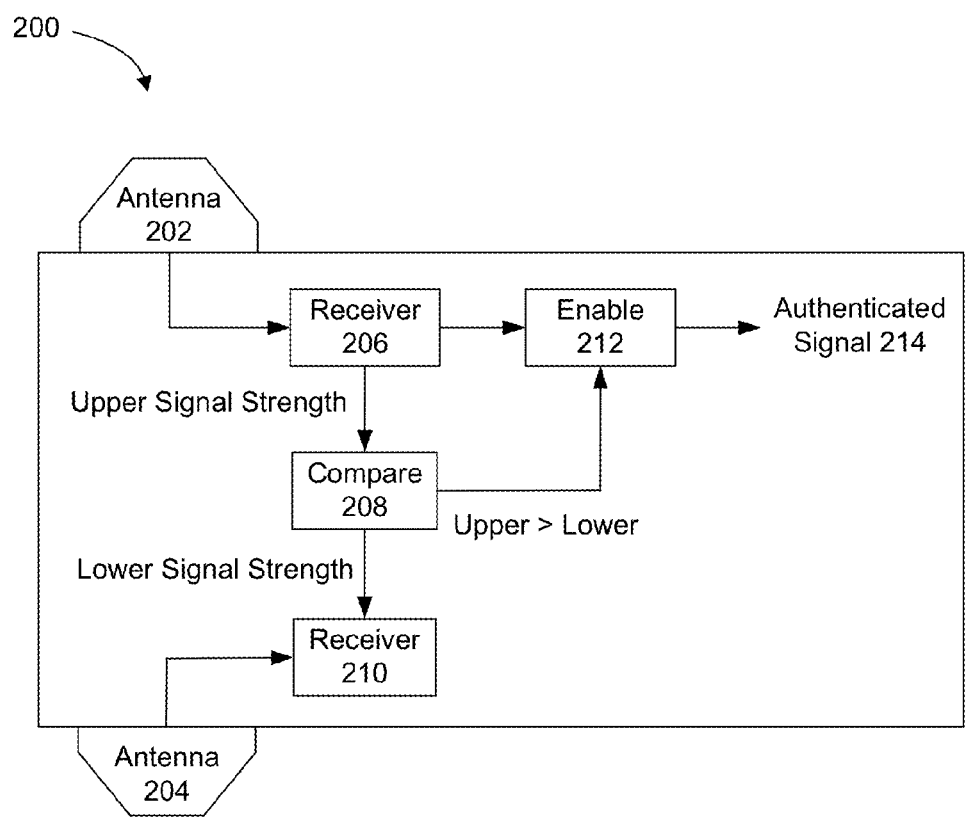
FIG. 2 is an example system for determining that a satellite signal received from a signal source is an authentic satellite signal in accordance with an embodiment of the present invention.

When signals 140 are received by the aircraft from the satellite source 140, the signals 140 received at the top antenna 150 may have stronger signal strengths as compared to the signals 140 received at the bottom antenna 152. In other words, the bottom antenna 152 may receive the signals 140 from the satellite source 110 at the lower signal strength because the aircraft's body may partially impede the communication of the signals to the bottom antenna 152. Similarly, when signals 140 are received by the aircraft from the terrestrial source 130, the signals 140 received at the bottom antenna 152 may have stronger signal strengths as compared to the signals 140 received at the top antenna 150. In other words, the aircraft's body may partially impede the communication of the signals from the terrestrial source 130 to the top antenna 150, thereby resulting in the lower antenna strength at the top antenna 150 as compared to the bottom antenna 152. In various embodiments, different criteria may be used for determining whether a signal is an authentic satellite signal or a signal from a terrestrial spoofer FIG. 2 is an example system 200 for determining that a signal is an authentic satellite signal 214. In one example, the system 200 may be included in an aircraft. The antennas 202 and 204 may be configured to receive satellite signals from a satellite source or a terrestrial source. The antennas 202 and 204 may be coupled to receivers 206 and 210 (e.g., satellite receivers), respectively. In one example, the antenna 202 may be located in an upper portion of an aircraft (e.g., the roof of the aircraft) and the antenna 204 may be located in a lower portion of an aircraft (e.g., an underside or "belly" of the aircraft).

The receivers 206 and 210 may determine the signal strengths associated with the first and second satellite signals. The signal strength received from the upper antenna may be compared with the signal strength received from the lower antenna (as shown in block 208). In this embodiment, a spoofed signal may be indicated when the signal strength from the upper antenna is less than some predetermined threshold above the signal strength from the lower antenna. The defined threshold may be set to cover the highest upper/lower ratio a spoofed signal may achieve (i.e., the ratio when the aircraft is banking towards the source of the spoofed signal). In addition, the predefined threshold may include a dynamic threshold based on at least one of: aircraft attitude, aircraft position, aircraft heading, and satellite position. Since low elevation satellite signals and satellite signals when the aircraft is banked away from the satellite may have lower gain, these satellite signals may not be above the defined threshold and therefore, whether the signal is spoofed may be undeterminable. However, high elevation satellite signals, such as from geosynchronous navigation or communication satellites, may be authenticated when the aircraft is banking using the defined threshold. As shown in the example in FIG. 6, the threshold for an aircraft in a 30° bank may be 10 dB. Since the cases of spoofed signals are below the 10 dB threshold, the risk of falsely authenticating a spoofed signal from a terrestrial source may be minimal. When the aircraft is banked away from the satellite, a legitimate satellite signal indicated by the elevation angles may not be authenticated when the satellite signal falls below the 10 dB threshold. This type of system may be adequate when the system only needs to authenticate high elevation satellite signals, such as geosynchronous satellites.

If the signal strength received from the upper antenna is greater by the predetermined threshold than the signal strength received from the lower antenna, then the signal may be enabled (as shown in block 212) as an authenticated satellite signal 214 being received from a satellite source.

Figure 3A:
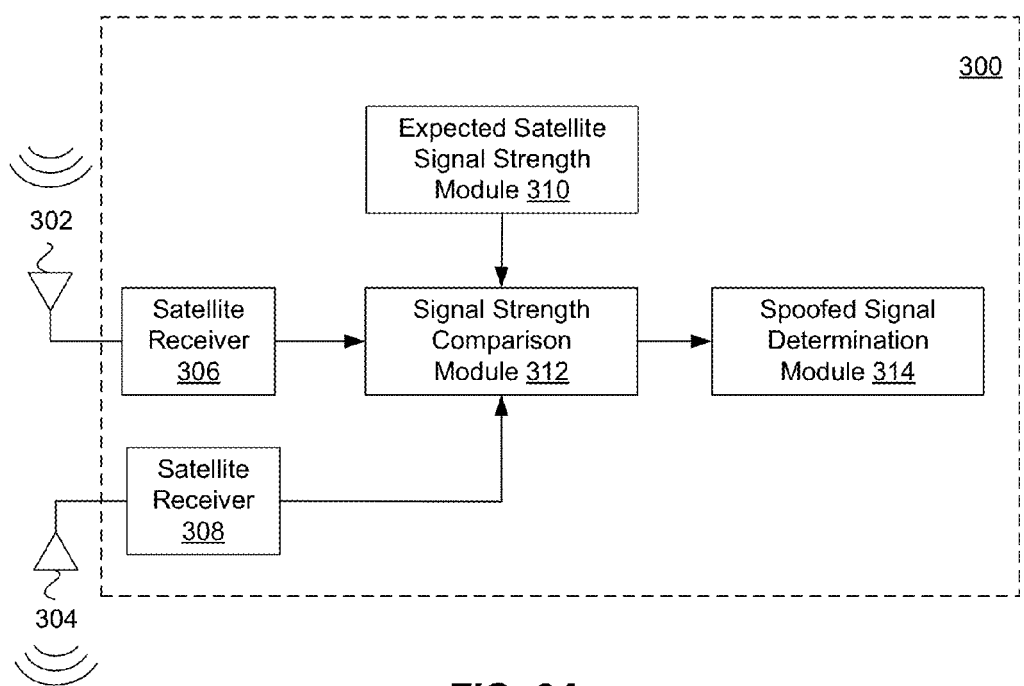
FIG. 3A is an example of a more robust system for determining that a satellite signal received from a signal source is an authentic satellite signal in accordance with an embodiment of the present invention.

FIG. 3A is another example system 300 for determining that a signal is an authentic satellite signal. The satellite receiver 306 may be coupled to an antenna 302. The satellite receiver 308 may be coupled to an antenna 304. In one example, the antenna 302 may be located in an upper portion of an aircraft (e.g., the roof of the aircraft) and the antenna 304 may be located in a lower portion of an aircraft (e.g., an underside or "belly" of the aircraft).

An expected satellite signal strength module 310 may use information about the antennas, aircraft position, aircraft heading, aircraft attitude, satellite position, and surrounding terrain to determine thresholds used by the signal strength comparison module 312.

In one configuration, the attitude of the aircraft may be used by an expected satellite signal strength module 310 to compute a satellite signal threshold. The satellite signal threshold may be the smallest when the aircraft is flying level and increasing as the aircraft pitches and/or banks. The smaller thresholds may allow valid satellite signals (e.g. signals from lower elevation satellites) to be authenticated.

In another configuration, aircraft position (e.g., geographical coordinates of the aircraft), aircraft heading and attitude, and a satellite position may be identified. This information may be used to calculate a direction (i.e. azimuth and elevation angles) of the satellite signal. The direction may be used in conjunction with a known antenna reception pattern to calculate the gain or loss of the satellite signal for both the upper and lower antennas with some threshold for normal variances. In this configuration, an expected satellite signal strength module 310 may compute a satellite signal threshold from the aircraft position, heading and attitude (i.e. pitch and bank of the aircraft), the position of the satellites, and antenna reception patterns. As an example, the satellite signal threshold for a satellite at a particular elevation may be read from the Satellite line in the graph of FIG. 5 for an aircraft in level flight or from the Satellite line in the graph of FIG. 6 for an aircraft in a 30 degree bank towards or away from the satellite.

In another configuration, the effective radiated power of the satellite signal and propagation losses may be identified. In this configuration, an expected satellite signal strength module 310 may compute expected satellite signal strengths from the aircraft position, heading and attitude (i.e., pitch and bank of the aircraft), the position of the satellite, expected satellite effective radiated power, propagation losses, and antenna reception patterns.

The expected satellite signal strength module 310 may also compute a terrestrial signal threshold from aircraft attitude and perhaps aircraft altitude and height of surrounding terrain (i.e. where a terrestrial source might be located). As an example, the terrestrial signal threshold may be computed from the Terrestrial line in the graph of FIG. 5 for an aircraft in level flight or from the Terrestrial lines in the graph of FIG. 6 for an aircraft in a 30 degree bank.

The first and second signals may be communicated to a signal strength comparison module 312. In one configuration, the signal strength comparison module 312 may compare the expected satellite signal strengths with the measured signal strengths. If the expected satellite signal strengths agree within a predefined threshold when compared with the measured signal strengths, the spoofed signal determination module 314 may indicate that the received signal is an authentic signal received from a satellite source. In another configuration, the signal strength comparison module 312 may compare the ratio of received signal strengths with the satellite signal threshold. If the ratio of received signal strengths passes the satellite signal threshold, the spoofed signal determination module 314 may indicate that the received signal is an authentic signal received from a satellite source. If the ratio of measured signal strengths passes the terrestrial signal threshold, then the spoofed signal determination module 314 may determine that the signal is a spoofed signal being communicated from a terrestrial source.

Figure 3B:
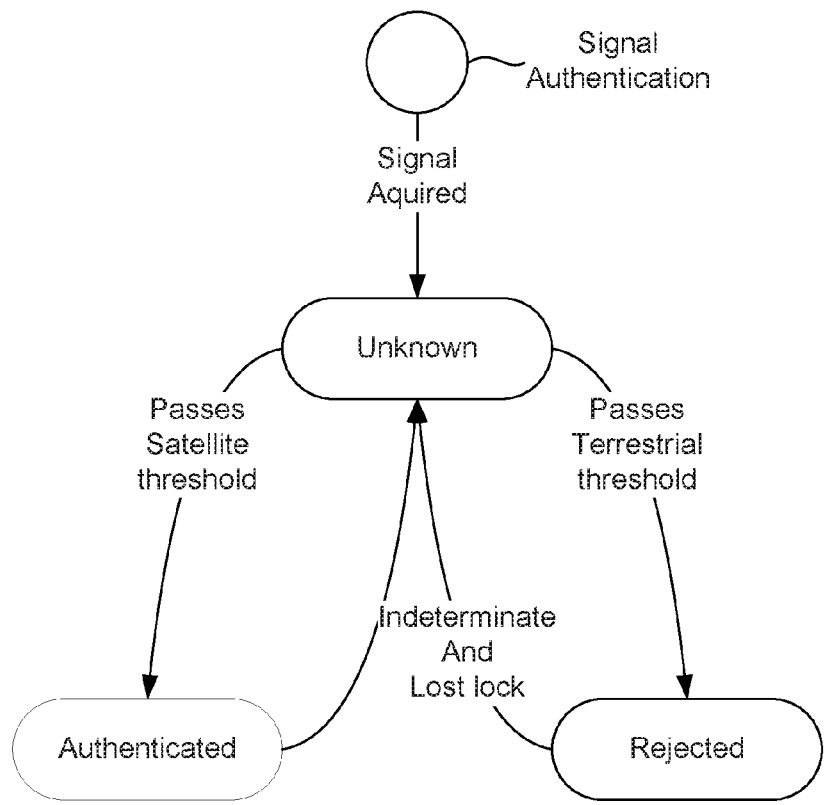
FIG. 3B illustrates a graphical representation for determining an unknown state, an authenticated state and a rejected state of a satellite signal in accordance with an embodiment of the present invention.

As shown in FIG. 3B, the signal authentication may include possible states of: Rejected (i.e. a spoofer), Unknown, and Authenticated (i.e. a legitimate satellite signal). When a signal is first acquired it has an authentication status of Unknown. The authentication status changes to Authenticated when the received signal strengths agree with the expected signal strengths or the signal ratio received from the upper and lower antennas passes the satellite signal threshold. The authentication status changes to Rejected when the signal ratio received from the upper and lower antennas passes the terrestrial signal threshold. The authentication status changes to Unknown when the received signal ratio is between thresholds and the receiver has lost lock on the signal. The authentication status is unchanged when the received signal ratio is between thresholds and the receiver has maintained lock on the signal. Thus, a satellite signal can stay in Authenticated state in cases where the aircraft banks away from the source of the satellite signal simply because the signal ratio received from the upper and lower antennas reasonably matches the ratio expected even though the ratio does not pass the satellite signal threshold.

Figure 3C:
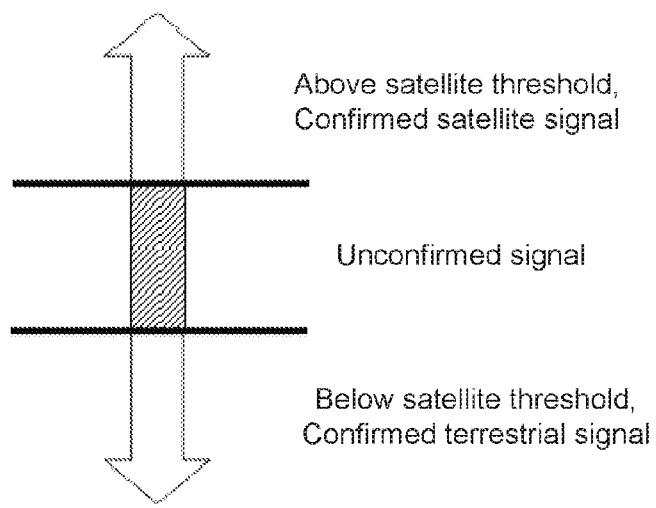
FIG. 3C illustrates a graphical representation for determining a satellite signal or a terrestrial signal in accordance with an embodiment of the present invention.

As shown in FIG. 3C, the received signal may be determined to be a satellite signal or a terrestrial signal. For example, if the received signal is above a satellite signal threshold, then the received signal may be a confirmed satellite signal. If the received signal is below a terrestrial signal threshold, then the received signal may be a confirmed terrestrial signal. Otherwise, the received signal may be an indeterminate signal and stays in current status if the receiver has maintained lock on the signal or changes to unknown status if the receiver has not maintained lock on the signal.

Figure 4:
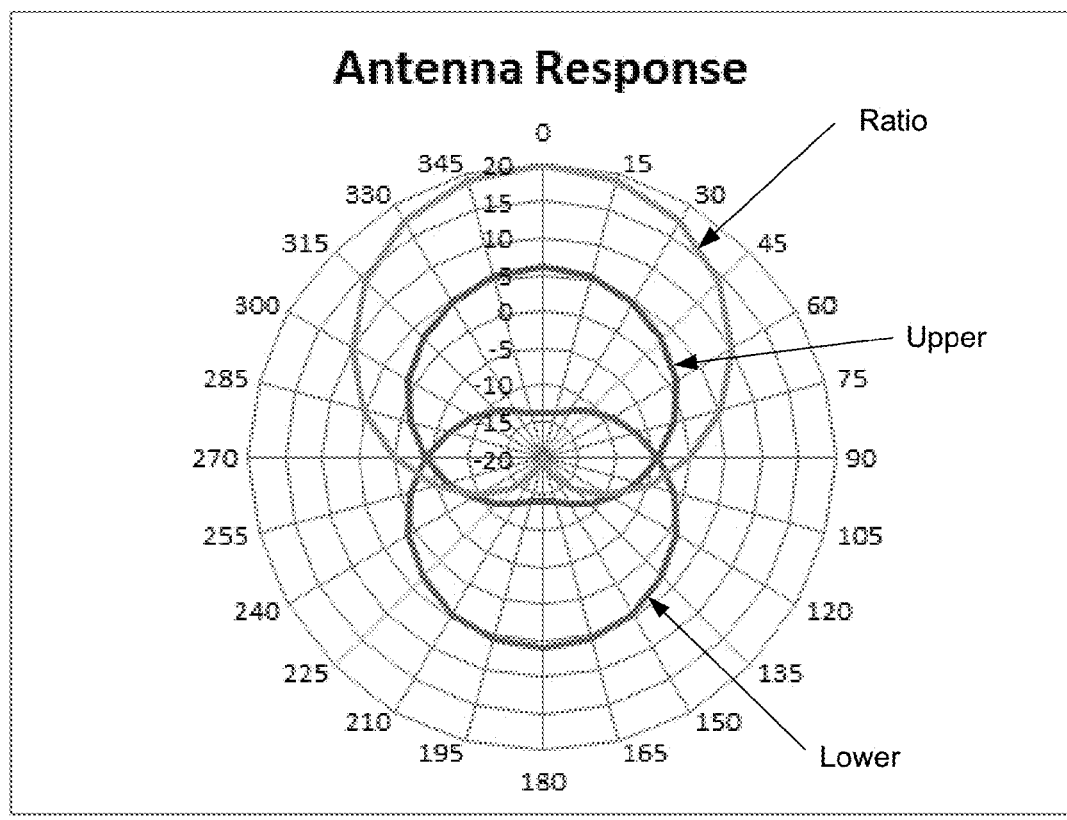
FIG. 4 is an example graphical representation of an antenna response for an upper antenna and a lower antenna receiving satellite signals in accordance with an embodiment of the present invention.

FIG. 4 is an example graphical representation of an antenna response for an upper antenna and a lower antenna receiving satellite signals. The antenna response may indicate the gain for a signal received by the antenna from a defined direction. In this example the direction is represented in degrees and the power level in decibels (dB).

In particular, FIG. 4 illustrates an expected antenna response for the upper level (i.e., when the antenna is mounted on the top of the aircraft), the antenna response for the lower level (i.e., when the antenna is mounted on the bottom of the aircraft), and a ratio representing the difference between the antenna response for the upper level and the antenna response for the lower level. The ratio may represent the signal strength measured by the receiver processing a signal from the upper antenna divided by signal strength measured by the receiver processing the same signal from the lower antenna. In one example, satellite sources may have a signal strength ratio greater than 1 or 0 dB and terrestrial sources may have a signal strength ratio of less than 1 or 0 dB.

Figure 5:
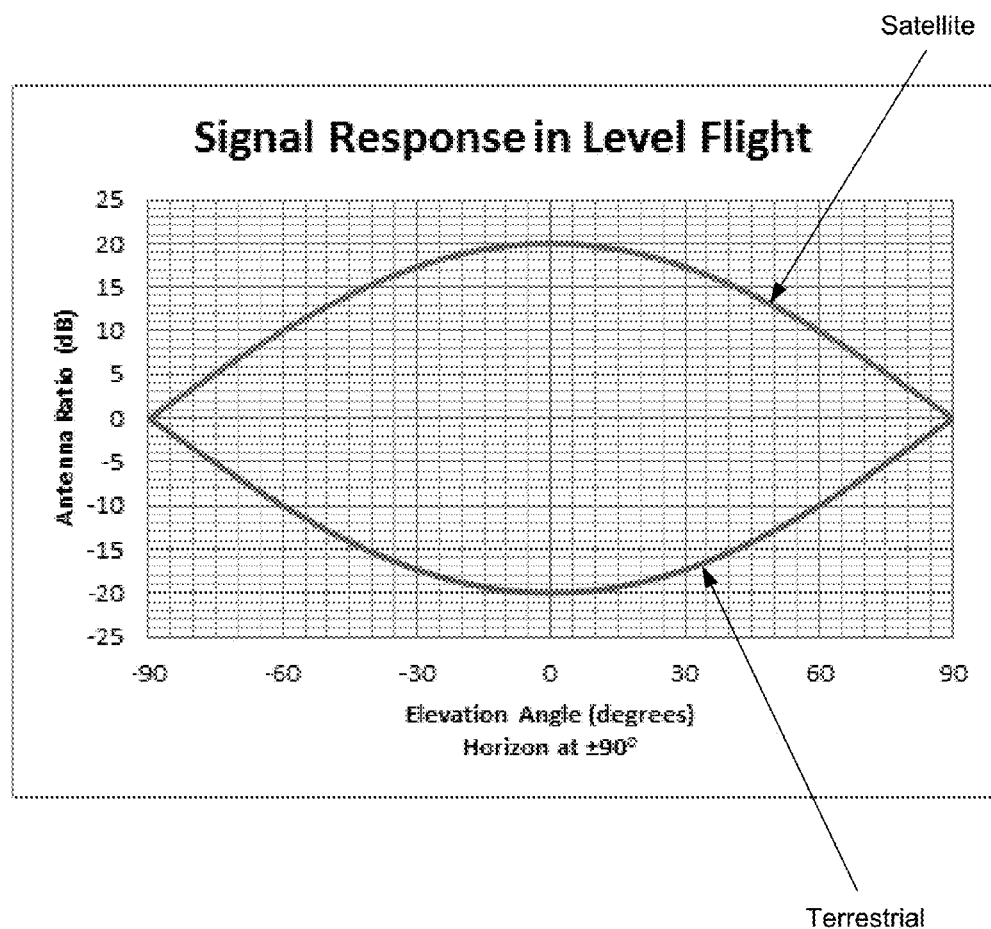
FIG. 5 is an example graphical representation of satellite signals in relation to terrestrial signals received at an aircraft in level flight in accordance with an embodiment of the present invention.

FIG. 5 is an example graphical representation of satellite signals in relation to terrestrial signals received at an aircraft in straight and level flight. FIG. 5 illustrates an expected antenna ratio (i.e., the upper signal divided by the lower signal) when the aircraft receives signals from a satellite source and when the aircraft receives signals from a terrestrial source. The expected antenna ratio (in dB) may vary depending on the elevation angle of the signal source. In general, the elevation angle is the angle between the horizontal plane and the line of sight, measured in the vertical plane. The elevation angle is positive above the horizon (0° elevation angle), but negative below the horizon.

As shown in FIG. 5, it may be difficult to distinguish satellite signals that are close to the horizon from terrestrial signals that are close to the horizon. However, very low elevation satellite signals have poorer signal to noise ratios and may be more susceptible to variations in propagation and reception. As a result, very low elevation satellite signals may be poor sources of communication or navigation signals. In addition, terrestrial signals close to the horizon may be much further from the aircraft and therefore require much higher power to be stronger than legitimate satellite signals than terrestrial signals in closer proximity to the aircraft. Therefore, the satellite signals that are close to the horizon being less distinguishable from the terrestrial signals that are close to the horizon may be an acceptable limitation.

Figure 6:
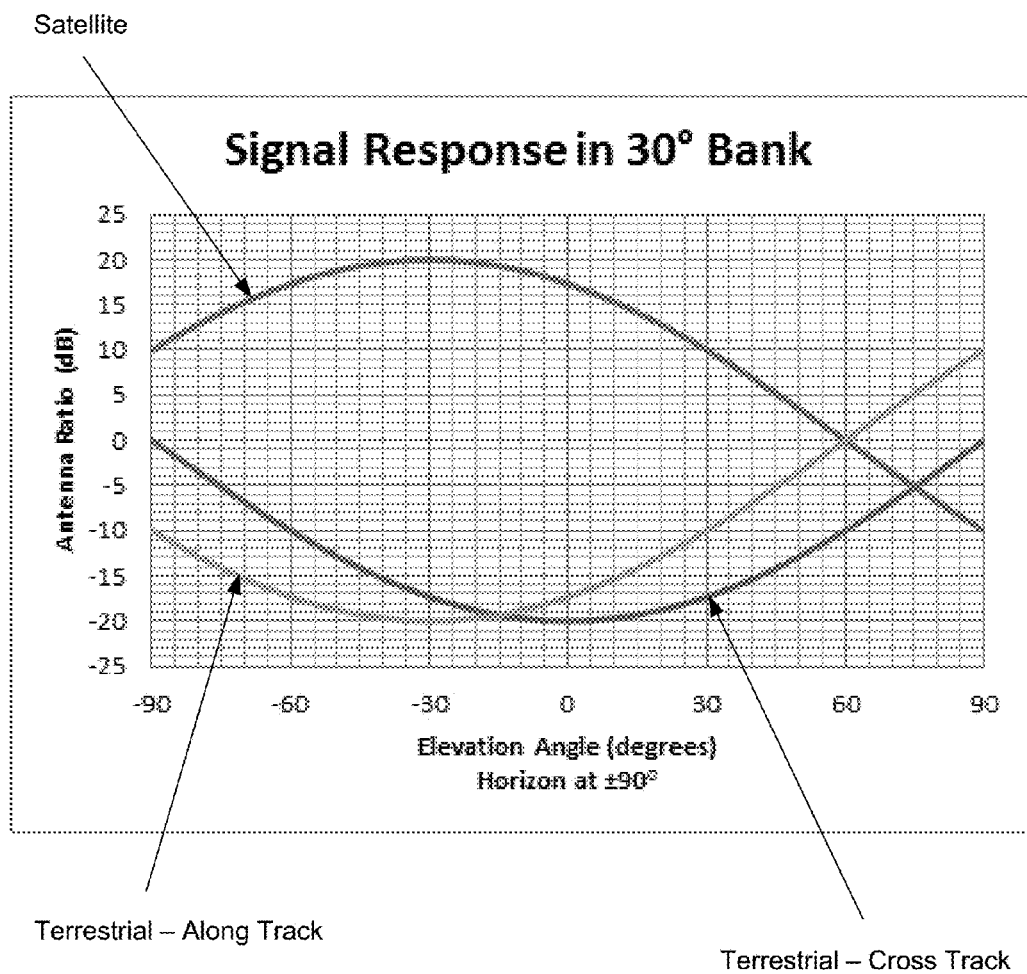
FIG. 6 is an example graphical representation of satellite signals in relation to terrestrial signals received while an aircraft is banking in accordance with an embodiment of the present invention.

FIG. 6 is an example graphical representation of satellite signals in relation to terrestrial signals received when the attitude of an aircraft changes from level, such as when the aircraft is turning or banking. In particular, FIG. 6 illustrates an expected antenna ratio (i.e., the upper signal divided by the lower signal) from a satellite source in relation to a terrestrial source for an aircraft in a 30° bank.

In one example, satellite sources may be differentiated from terrestrial sources when the satellite signal curve is above the peak of the two terrestrial signal curves (i.e., the "terrestrial-along-track" curve and the "terrestrial-cross-track" curve). The peak of the terrestrial signal curves may be used so that information on the location of the terrestrial signals may be unnecessary.

As shown in FIG. 6, the "terrestrial-along-track" signal curve illustrates that, for a spoofed signal source in line with the path the aircraft is flying, the signals received by the aircraft may be unaffected by the banking until the aircraft turns and the source is no longer in line with the aircraft's flight path. The "terrestrial-cross-track" signal curve illustrates that the upper/lower ratio increases for spoofed signal sources in the direction of the aircraft bank, as well as the decreases for spoofed signal sources opposite the direction of the aircraft bank. The converse may be true for changes in aircraft pitch with "along track" affected by pitch and "cross track" not affected by pitch.

As shown in FIG. 6, satellite signals close to the horizon opposite the direction the aircraft is banking may fall below 0 dB, and terrestrial signals (i.e., the "terrestrial-along-track" signal curve) close to the horizon in the direction that the aircraft is banking may rise above 0 dB. In addition, terrestrial signals along the axis of the bank (i.e., the "terrestrial-cross-track" signal curve) may be unchanged. In addition, high elevation (i.e. near zero) satellite signals and satellite signals from the direction of the bank may be authenticated, but not satellite signals opposite the direction of the bank. For example, satellite signals may be differentiated from terrestrial sources when satellite signals less than 15° above the horizon and terrestrial sources farther from the aircraft nadir than the aircraft altitude (i.e., elevation angles greater than −45°) are excluded.

In accordance with one embodiment of the present invention, a method for detecting spoofed satellite signals is disclosed. The method can comprise: receiving a signal via a first antenna, the first antenna located on an upper portion of an aircraft; receiving the signal via a second antenna, the second antenna located on a lower portion of the aircraft; comparing a first signal strength associated with the signal received via the first antenna with a second signal strength associated with the signal received via the second antenna; and determining that the signal is a spoofed satellite signal being communicated from a terrestrial source when the second signal strength is greater than the first signal strength.

In one aspect, the method further comprises using the signal received via the first antenna when the first signal strength associated with the signal received via the first antenna is greater than the second signal strength associated with the signal received via the second antenna. In addition, the first antenna and the second antenna receive the same signal from a signal source, the signal source including at least one of: a satellite source and the terrestrial source.

In one aspect, the method further comprises comparing the first signal strength associated with the signal and the second signal strength associated with the signal with a dynamic threshold; and determining that the signal is the spoofed satellite signal being communicated from a terrestrial source based on the dynamic threshold. In addition, the method further comprises determining that the signal is the spoofed satellite signal being communicated from the terrestrial source when the aircraft is banked at a defined angle based on the first signal strength in relation to the second signal strength.

In accordance with one embodiment of the present invention, an additional method for detecting spoofed satellite signals is disclosed. The method can comprise: receiving a signal via a plurality of antennas, wherein the plurality of antennas are positioned on an aircraft; and determining that the signal is a spoofed satellite signal based on a comparison of the signal strength received via each of the plurality of antennas. In one example, the plurality of antennas are positioned on an upper portion or a lower portion of the aircraft.

In one aspect, the method can further comprise performing the comparison using an aircraft attitude to determine an expected relative signal strength between the plurality of antennas for an authentic satellite signal. In addition, the method can comprise performing the comparison using at least one of aircraft position, aircraft heading, aircraft attitude, and satellite position to determine an expected relative signal strength between the plurality of antennas for an authentic satellite signal.

In an additional aspect, the method can further comprise performing the comparison using an aircraft attitude to determine an expected relative signal strength between the plurality of antennas for the spoofed satellite signal from a terrestrial source. In addition, the method can further comprise performing the comparison using at least one of aircraft position, aircraft heading, aircraft attitude, and information on surrounding terrain to determine an expected relative signal strength between the plurality of antennas for the spoofed satellite signal from a terrestrial source.

In one aspect, the method can further comprise determining that the spoofed satellite signal is from a terrestrial signal source. In addition, the method can further comprise using a dynamic threshold for determining that the signal is the spoofed satellite signal from the terrestrial source or an authentic satellite signal, wherein the dynamic threshold is based on at least one of: aircraft attitude, aircraft position, aircraft heading, and satellite position.

In an additional aspect, the method can further comprise determining an authenticated state when relative signal strengths associated with the signal meets the dynamic threshold for confirming that the signal is the authentic satellite signal. In addition, the method can further comprise determining a rejected state when relative signal strengths associated with the signal meets the dynamic threshold for confirming that the signal is the spoofed satellite signal from the terrestrial source. Furthermore, the method can further comprise determining an unknown state when relative signal strengths associated with the signal does not meet the dynamic threshold for confirming that the signal is the authentic satellite signal nor for confirming that the signal is the spoofed satellite signal from the terrestrial source.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for detecting spoofed satellite signals, the method comprising:
   receiving a signal via a first antenna, the first antenna located on an upper portion of an aircraft;
   receiving the signal via a second antenna, the second antenna located on a lower portion of the aircraft;
   comparing a first signal strength associated with the signal received via the first antenna with a second signal strength associated with the signal received via the second antenna; and
   determining that the signal is a spoofed satellite signal being communicated from a terrestrial source when the second signal strength is greater than the first signal strength.

2. The method of claim 1, further comprising using the signal received via the first antenna when the first signal strength associated with the signal received via the first antenna is greater than the second signal strength associated with the signal received via the second antenna.

3. The method of claim 1, wherein the first antenna and the second antenna receive the same signal from a signal source, the signal source including at least one of: a satellite source and the terrestrial source.

4. The method of claim 1, further comprising
   comparing the first signal strength associated with the signal and the second signal strength associated with the signal with a dynamic threshold; and
   determining that the signal is the spoofed satellite signal being communicated from a terrestrial source based on the dynamic threshold.

5. The method of claim 1, further comprising determining that the signal is the spoofed satellite signal being communicated from the terrestrial source when the aircraft is banked at a defined angle based on the first signal strength in relation to the second signal strength.

6. A system for detecting spoofed satellite signals, the system comprising:
   a receiving module configured to receive a signal via a first antenna and via a second antenna, wherein the first antenna is located on an upper portion of an aircraft and the second antenna is located on a lower portion of the aircraft;
   a comparison module configured to compare a first signal strength associated with the signal received via the first antenna with a second signal strength associated with the signal received via the second antenna; and
   a signal module configured to determine that the signal is a spoofed satellite signal being communicated from a terrestrial source when the second signal strength is greater than the first signal strength.

7. The system of claim 6, wherein the signal module is further configured to use the signal received via the first antenna when the first signal strength associated with the signal received via the first antenna is greater than the second signal strength associated with the signal received via the second antenna.

8. The system of claim 6, wherein:
   the comparison module is further configured to compare the first signal strength associated with the signal and the second signal strength associated with the signal with a dynamic threshold; and
   the signal module is further configured to determine that the signal is the spoofed satellite signal being communicated from the terrestrial source based on the dynamic threshold.

9. The system of claim 8, wherein the dynamic threshold is based on at least one of: aircraft attitude, aircraft position, aircraft heading, and satellite position.

* * * * *

UNITED STATES PATENT AND TRADEMARK OFFICE
CERTIFICATE OF CORRECTION

PATENT NO. : 9,523,774 B2
APPLICATION NO. : 14/066897
DATED : December 20, 2016
INVENTOR(S) : Steven P. Davies Page 1 of 1

It is certified that error appears in the above-identified patent and that said Letters Patent is hereby corrected as shown below:

On the Title Page

Item (72) Inventor section, "Stephen" P. Davies should be --Steven-- P. Davies.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*